United States Patent Office 2,972,106
Patented Feb. 14, 1961

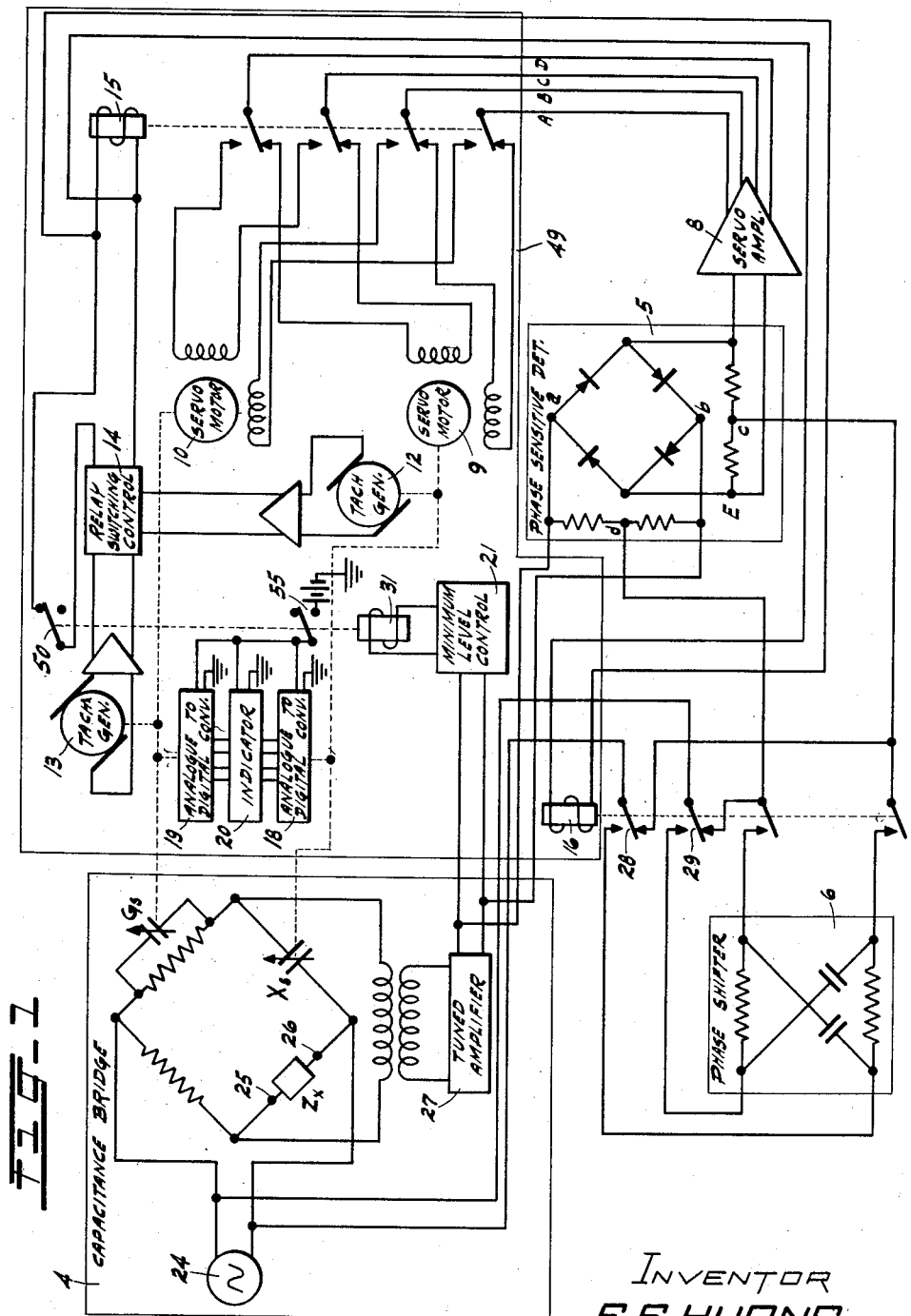

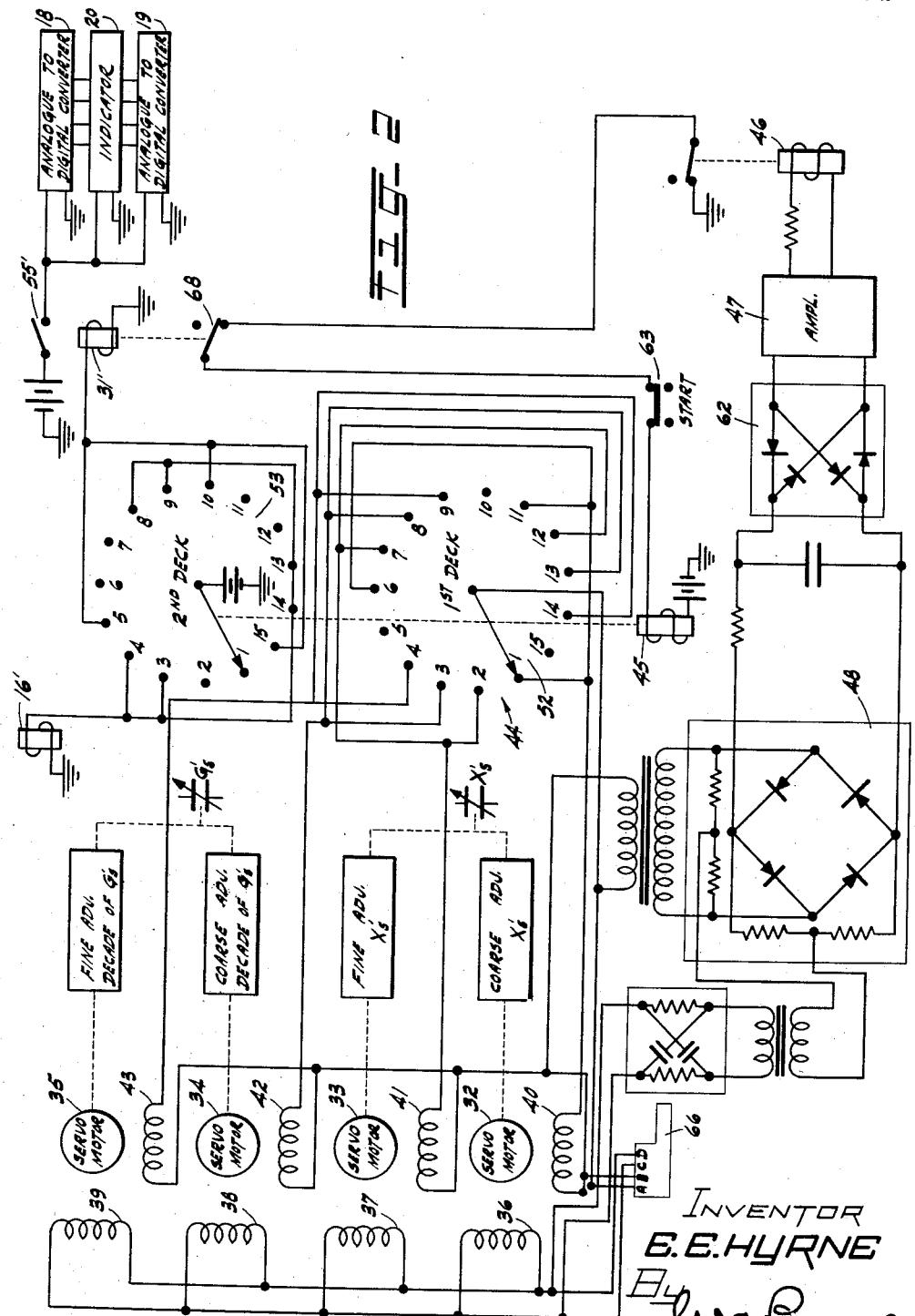

2,972,106

AUTOMATIC ALTERNATING CURRENT BRIDGE

Edward E. Hyrne, Matawan, N.J., assignor to Western Electric Company, Incorporated, New York, N.Y., a corporation of New York Filed Apr. 9, 1958, Ser. No. 727,373

9 Claims. (Cl. 324—57)

This invention relates to the testing of complex electrical impedance elements and particularly to alternating current bridges used in determining the reactance and conductance components of the impedances of such elements.

An object of this invention is an automatic alternating current bridge system.

Another object is the automatic balancing of alternating current bridges to determine both the reactance and conductance components of electrical impedance elements.

According to the general features of the invention, an alternating current bridge, having an adjustable reactance balancing element and an adjustable conductance balancing element for determining the reactance and conductance components, respectively, of a complex impedance element connected in the bridge, is provided with a phase-sensitive detector in its output and reversible drivers for adjusting each of the balancing elements. The output of the detector is automatically switched from one driver to the other when the driven bridge element reduces the bridge unbalance output to the point where the detector output reaches its polarity reversal condition. The phase reference potential input to the detector bears a predetermined phase relationship to the bridge input voltage and, whenever the switching occurs between reactance and conductance drivers, the phase of one of the inputs is shifted to increase the sensitivity of the detector to the remaining bridge unbalance output, thereby facilitating balancing both reactance and conductance components of the impedance element under test.

According to a feature of the invention, the results of the test are automatically indicated in digital form when the proper bridge balance is reached.

These and other features of the invention will be more fully understood from the following detailed description when taken in conjunction with the accompanying drawing, in which:

Fig. 1 is a schematic diagram of an alternating current bridge system illustrating the invention, and Fig. 2 is a schematic diagram of an alternate servo motor control for a bridge system of the type disclosed in Fig. 1, in which the bridge is provided with "coarse" and "fine" adjustments for each of the reactance and the conductance balancing elements.

The principal parts of the bridge system disclosed in Fig. 1 include an alternating current bridge 4, a phase-sensitive detector 5 connected to the bridge output, a phase shifter 6 for shifting the phase of the reference potential supplied to the detector 5, a servo amplifier 8 in the output of the detector, a servo motor 9 for varying the reactance balancing element $X_s$ of the bridge, a servo motor 10 for adjusting the conductance balancing element $G_s$ of the bridge, tachometer generators 12 and 13 for a switching control device 14 for operating relays 15 and 16 to switch the output of the servo amplifier from one servo motor to the other and to switch the phase shifter 6 to the phase-sensitive detector 5, respectively, analog-to-digital converters 18 and 19, a results indicator 20, and a control device 21 therefor.

The bridge circuit shown in Fig. 1 is a Schering-type, capacitance bridge, however, the bridge may be any type of alternating current bridge having both reactance and conductance balancing elements. The bridge is energized from an alternating current supply 24 and an unknown complex impedance element $Z_x$ is connected to terminals 25 and 26 in one arm of the bridge. The output of the bridge is fed from a tuned amplifier 27 to both the control device 21 and the input terminals $a$ and $b$ of the detector 5. While the other types of phase-sensitive detectors may be employed, a ring modulator-type having passive circuit elements such as silicon diodes has been found to require almost no maintenance and yet performs the required function well. The phase reference potential for the detector is provided from the bridge source 24 through the normally open contacts 28 and 29 of relay 16 to the input terminals $c$ and $d$ of the ring modulator. Relay 16 is operated when the conductance adjusting servo motor 10 is energized, as will be disclosed below, to connect the phase shifter 6 in circuit with the source 24 and the input terminals $c$ and $d$ of the ring modulator. Phase shifter 6 provides a ninety-degree phase shift in the reference potential applied to the terminals $c$ and $d$.

Like other phase-sensitive detectors, the output of the disclosed ring modulator detector is greatest when the phases of the two applied voltages are 180 degrees apart. In the present circuit, however, when the reactance component $X_s$ is balanced to a null, the unbalanced residual quadrature component in the output of the amplifier 27 differs in phase from the phase reference input to terminals $c$ and $d$ by only ninety degrees. By switching the phase shifter 6 into the phase reference input to the detector, the phase relationship between the two inputs is made in the order of 180 degrees, thereby providing maximum sensitivity and greatest output of the bridge for balancing the conductance component of the unbalance bridge voltage.

In addition to adjusting the reactance balancing element $X_s$, servo motor 9 drives the tachometer generator 12 and the analog-to-digital converter 18. Similarly, the servo motor 10, in addition to driving the conductance balancing element $G_s$ also drives the tachometer generator 13 and the analog-to-digital converter 19. The outputs of the tachometer generators are fed through respective amplifiers to the relay switching control 14 which produces an output potential for operating the relays 15 and 16 whenever the two inputs thereto from the tachometer generators reach zero. Since only the driven generator has an output, the control 14 will operate when the driven generator momentarily stops, that is, when its servo motor reaches a reversal condition. The control 14 may be of the type including a multivibrator having two conditions of stable equilibrium with a biased amplifier in its input operable to produce a triggering signal for the multivibrator only when the outputs of the generators reach zero. Relays 15 and 16 remain in their operated condition until the next operation of the control 14 which will occur the next time both tachometer generators are again stopped.

The minimum level control 21 produces an operating potential for relay 31 in its output when the bridge unbalance potential in its input falls to a predetermined minimum value. Any conventional circuit may be used as, for example, a multivibrator circuit. The analog-to-digital converters 18 and 19 are driven by the respective servo motors to positions corresponding to the adjusted positions of $X_s$ and $G_s$, respectively, and when the relay 31 in the output of the control device 21 is operated, its contacts 55 close to lock up the converters 18 and 19 and energize the indictaor 20 to display the signal outputs from the converters. The converters are of commercially available types, such as those manufactured by the Fisher Porter Company of Hatboro, Pennsylvania. The indicator may be two tape punches or teletypewriters for making permanent records of the bridge balance settings of $X_s$ and $G_s$, respectively. A single teletypewriter or tape punch could be used by the addition of suitable translating and storage media.

In operation, when an impedance element $Z_x$ is connected into the bridge, the bridge unbalance potential resulting therefrom is applied to the ring modulator which produces a direct current signal for the chopper input of servo amplifier 8. The output of the amplifier is first applied to servo motor 9 for driving the reactance balancing element $X_s$ until the output of the phase detector 5 reaches its polarity reversal condition at which time the servo motor reaches a momentary stop. When the reversal condition is reached, the tachometer generator 12 driven by motor 9 is momentarily stopped thereby and has no output. The switching control 14 thereupon operates to energize the relays 15 and 16. The relays switch the output of the servo amplifier 8 to the servo motor 10 and also introduce the ninety-degree phase shift from the shifter 6 to the reference potential applied to the phase detector 5. The sensitivity of the phase detector is increased substantially by the introduction of the ninety-degree phase shift in its reference potential and produces an appreciable output potential corresponding to the unbalanced conductance component of the unbalance voltage to drive the servo motor 10 until the adjustment in the conductance adjusting element $G_s$ results in a minimum bridge output at which time servo motor 10 reaches its reversal condition and momentarily stops. The output of tachometer generator 13 is thereby reduced to zero and the switching control 14 again operates relays 15 and 16 to render servo motor 9 operative again. This switching action will continue until the desired bridge null is reached at which time the minimum level control 21 is rendered operative to operate relay 31 so that the digital information available in the converters 18 and 19 may be displayed or recorded by the indicator 20. When the relay 31 is operated its contacts 50 open the energizing circuit for relays 15 and 16, thereby stopping the switching action.

Fig. 2 discloses alternate circuit elements for those enclosed in the box designated 49 in Fig. 1; the common portion of the system of Fig. 1 being shown as the box 66. In this system "coarse" and "fine" adjusting mechanisms are provided for the reactance and conductance bridge balancing elements $X'_s$ and $G'_s$ which correspond to $X_s$ and $G_s$ of Fig. 1. Servo motors 32 and 33 drive the "coarse" and "fine" reactance adjusting mechanisms for $X'_s$ and servo motors 34 and 35 drive the corresponding mechanisms for $G'_s$. One winding, 36, 37, 38 and 39 of each of the servo motors is connected directly to the leads C and D, respectively, of the output of servo amplifier 8 of Fig. 1. The other windings 40, 41, 42 and 43 of the respective servo motors are successively connected to the output leads A and B of the servo amplifier 8 of Fig. 1 through the first deck 52 of a step switch 44. The step switch 44 is operated similarly to that of the switching relay 15 of the system of Fig. 1, that is, whenever a driven servo motor connected in the output of amplifier 8 reaches its reversal condition. The actuator 45 of the selector switch 44 is energized to step the switch one position whenever a normally operated relay 46 in the output of an amplifier 47 is released. The amplifier 47 is energized from a rectifier 62 in the output of phase-sensitive detector 48 which in turn is energized from the output of the servo amplifier 8 so that whenever the one of the motors 32, 33, 34 or 35 that is energized reaches a stop or phase reversal condition, the input to the amplifier 62 will momentarily pass through a zero point and the relay 46 in the output of the amplifier releases and momentarily opens the energizing path for the actuator 45, causing it to advance the armatures of the two decks of the step switch to the next position. A "start" switch 63 is provided in series with relay 45 in order to step the switch for starting an operating cycle.

By utilizing the step switch, first, motor 32 for the "coarse" adjustment of the reactance adjusting element $X'_s$ is driven until its energizing voltage is reversed in phase, and when the motor 32 stops, before changing direction of rotation, the actuator 45 steps the switch to the next position where the second motor 33 for varying the "fine" adjustment of the element $X'_s$ is energized. When the servo motor 33 reaches its reversal condition, the selector 45 again steps the switch connecting the "coarse" adjusting motor 34 for element $G'_s$ to the output of the amplifier 8. At this time the armature of the second deck 53 of the step switch is moved to a contact to supply energizing current for a relay 16' which corresponds to the relay 16 of Fig. 1 and operates the contacts disclosed in Fig. 1, operable thereby for connecting the phase shifter 6 into the phase reference input of the phase-sensitive detector 5. The motor 34 drives until the energizing voltage therefor reaches its reversal condition at which time the actuator 45 steps to connect the "fine" adjust servo motor 35 in the circuit. The phase shift control relay 16' is held operated for this operation by the second deck 53 of the step switch. Motor 35 drives until the energizing voltage therefor reaches its reversal condition and the switch 44 is stepped to its next position to terminate the operation of the bridge.

In this system the control for a relay 31', corresponding to relay 31 of Fig. 1, is provided by the second deck 53 of the step switch. The armature of this deck is connected directly to an energizing source so that after the four motors 32, 33, 34 and 35 have been successively energized and nulled, the armature of the second deck is stepped to engage a contact connected to relay 31', thereby energizing the relay. As with the operation of relay 31 of the system of Fig. 1, when contacts 55' of relay 31' close, the converters 18 and 19 are locked up and indicator 20 is operated. At the same time, contacts 68 open the energizing circuit for the actuator 45 of switch 44 and thereby stop its operation until the balancing sequence is again started by depressing a start switch 63 to re-energize the step switch actuator 45. With the step switch controlling the end of test, the deck 52 may be arranged to repeat the servo motor actuating sequence as many times as desired before the armature on the deck 53 closes the energizing circuit for relay 31'.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A test set for automatically determining the reactance and conductance of electrical impedance elements comprising an alternating current bridge having means for receiving impedance elements to be tested therein, an adjustable reactance balancing element, and an adjustable conductance balancing element, a source of alternating current connected to the input of the bridge for energizing the bridge, a phase-sensitive detector connected to the output of the bridge, a first reversible driver connected to said reactance balancing element for adjusting said reactance element, a second reversible driver connected to said conductance balancing element for adjusting said conductance element, means for switching the output of the detector between the drivers, means responsive to a polarity reversal in the output of the detector for actuating the switching means, means responsive to the operation of the switching means, including a phase shifter connectable between the alternating current source and the detector, for alternately applying two phase reference potentials to the detector, the phase reference potentials having predetermined phase relationships to the input alternating current, and indicating means actuated in accordance with the positions of the adjustable elements for indicating the value of the reactive and conductive components of the impedance of a tested element.

2. A test set for automatically determining the reactance and conductance of electrical impedance elements comprising an alternating current bridge having means for receiving impedance elements to be tested therein, an adjustable reactance balancing element, and an adjustable conductance balancing element, a source of alternating current connected to the input of the bridge for energizing the bridge, a phase-sensitive detector connected to the output of the bridge, a first reversible driver connected to said reactance balancing element for adjusting said reactance element, a second reversible driver connected to said conductance balancing element for adjusting said conductance element, means for switching the output of the detector between the drivers, means responsive to a polarity reversal in the output of the detector for actuating the switching means, means connected to an input of the detector and operable by the switching means for producing a phase shift in the detector, and indicating means actuated in accordance with the positions of the adjustable elements for indicating the value of the reactive and conductive components of the impedance of a tested element.

3. In an alternating current bridge having means for receiving complex impedance elements to be tested therein, an adjustable capacitance balancing element, an adjustable conductance balancing element, a source of alternating current connected to the bridge input, for energizing the bridge, and a phase-sensitive detector connected to the output of the bridge, means including a phase shifter connectable between the source and the detector for alternately applying to the detector two phase reference potentials bearing a predetermined phase relationship to the source, means for automatically balancing the bridge comprising servo motors linked to the elements for driving each of the adjustable balancing elements, a servo motor amplifier connected in the output of the detector, means connected to the amplifier output for switching the output of the amplifier between the motors, and means responsive to a momentary stoppage of an energized motor resulting from a reversal in polarity in the output of the detector for actuating the switching means, the means for alternately applying the two reference potentials to the detector operating to change the reference potential whenever the switching means is actuated.

4. A test set according to claim 1 in which the means for actuating the switching means comprises two tachometer generators, means connecting each of the generators in driving relation with corresponding ones of the drivers, a relay having contacts for switching the output of the detector between the two drivers, and control means connected between the generators and the relay and responsive to the two generators for actuating the relay when the outputs of both generators are at minimum values.

5. A test set according to claim 2 in which the means for actuating the switching means comprises two tachometer generators, means connecting each of the generators in driving relation with corresponding ones of the drivers, a relay having contacts for switching the output of the detector between the two drivers, and control means connected between the generators and the relay and responsive to the two generators for actuating the relay when the outputs of both generators are at minimum values.

6. A test set for automatically determining the reactance and conductance of electrical impedance elements and for displaying the results in digital form comprising an alternating current bridge having means for receiving impedance elements to be tested therein, an adjustable reactance balancing element, an adjustable conductance balancing element, a source of alternating current connected to the bridge input for energizing the bridge, and a phase-sensitive detector connected to the output of the bridge, a first reversible driver connected to said reactance balancing element for adjusting said reactance element, a second reversible driver connected to said conductance balancing element for adjusting said conductance element, means for switching the output of the detector between the drivers, means responsive to a polarity reversal of the detector output for actuating the switching means, means responsive to the operation of the switching means, including a phase shifter connectable between the alternating current source and the detector, for alternately applying two phase reference potentials to the detector, the phase reference potentials having predetermined phase relationships to the input alternating current, an analog to digital converter controlled by each of the drivers, an indicator responsive to the converters, and means connected to the converters and the indicator and responsive to the reduction of the bridge unbalance voltage to a predetermined minimum value for actuating the indicator to display digital information corresponding to the adjusted condition of the bridge balancing elements.

7. A test set according to claim 2 in which the first and second drivers comprise coarse adjusting mechanisms for each of the balancing elements, second and third reversible drivers are respectively connected to the reactance and conductance elements for fine adjustment, and the switching means sequentially connects first the coarse and then the fine adjusting mechanisms of each of the balancing elements to the output of the detector.

8. A test set according to claim 7 in which the switching means comprises a step switch having contacts for rendering the phase shifting means operative when the coarse and fine adjusting mechanisms of one of the balancing elements are connected to the output of the detector.

9. A test set according to claim 8 in which the reversible drivers are servo motors energized by an amplifier connected in the output of the detector and means for actuating the step switch comprises an amplifier for controlling operation of the step switch, and a phase-sensitive detector connected in the output of the servo amplifier for triggering the operation of the amplifier whenever the servo motor excitation passes through its phase reversal condition.

References Cited in the file of this patent

UNITED STATES PATENTS

| 2,535,027 | Anderson | Dec. 26, 1950 |
| 2,639,411 | Schafer | May 19, 1953 |
| 2,833,928 | Parsons | May 6, 1958 |

FOREIGN PATENTS

| 579,530 | Great Britain | Aug. 7, 1946 |